(12) United States Patent
Caldwell et al.

(10) Patent No.: US 7,052,046 B2
(45) Date of Patent: May 30, 2006

(54) METHOD AND APPARATUS FOR A RETRACTABLE PNEUMATIC LINE COUPLING PROTECTOR

(76) Inventors: Cary Caldwell, 19975 Stanton Ave., Castro Valley, CA (US) 94546; Stefan Matter, 3505 Wind Cave Ct., Pleasanton, CA (US) 94588

( * ) Notice: Subject to any disclaimer, the term of this patent is extended or adjusted under 35 U.S.C. 154(b) by 0 days.

(21) Appl. No.: 10/418,258

(22) Filed: Apr. 16, 2003

(65) Prior Publication Data

US 2004/0207196 A1    Oct. 21, 2004

(51) Int. Cl.
*B60D 1/62* (2006.01)
*B61G 5/08* (2006.01)

(52) U.S. Cl. .............. 285/69; 285/65; 285/66; 285/67; 285/45

(58) Field of Classification Search ........... 285/65–79, 285/316, 45, 53
See application file for complete search history.

(56) References Cited

U.S. PATENT DOCUMENTS

| | | | | |
|---|---|---|---|---|
| 449,789 A | * | 4/1891 | Wright | 285/73 |
| 1,220,503 A | * | 3/1917 | Duty et al. | 285/27 |
| 1,885,523 A | * | 11/1932 | Kosanovich | 137/349 |
| 2,721,313 A | | 10/1955 | English | |
| 2,753,536 A | | 7/1956 | Tjader | |
| 2,946,035 A | | 7/1960 | Tuchel | |
| 3,005,176 A | | 10/1961 | Berg | |
| 3,097,034 A | | 7/1963 | Jamrosy | |
| 3,339,171 A | | 8/1967 | Carlson | |
| 4,550,928 A | * | 11/1985 | Berg | 280/421 |
| 4,634,151 A | * | 1/1987 | Holt | 285/38 |
| 4,747,623 A | | 5/1988 | Newcomb et al. | |
| 6,102,443 A | | 8/2000 | Lang, Jr. | |
| 6,120,064 A | * | 9/2000 | McNamara | 285/38 |

* cited by examiner

*Primary Examiner*—James M. Hewitt
(74) *Attorney, Agent, or Firm*—GSS Law Group; Earle Jennings

(57) ABSTRACT

The invention protects an at least two component pneumatic coupling. One embodiment contains a spring stop rigidly coupled to one of the pneumatic coupling components, and a spring between the spring stop and a housing. The invention includes a method of protecting pneumatic coupling using an apparatus and the method of making the apparatus. Another embodiment uses a collect clamp coupled to the housing and a collet press matching the collet clamp. Various embodiments apply to trucks and trailers, and other embodiments also apply to rail cars.

11 Claims, 6 Drawing Sheets

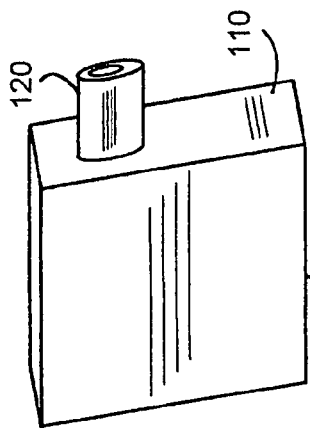
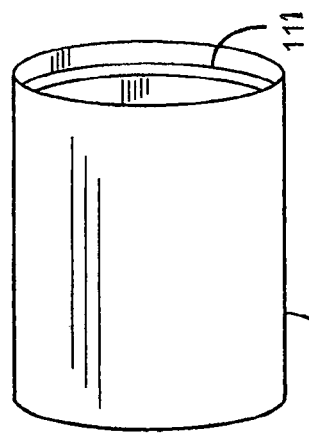
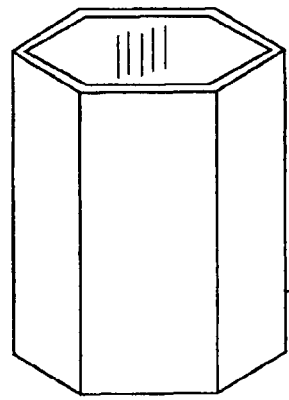
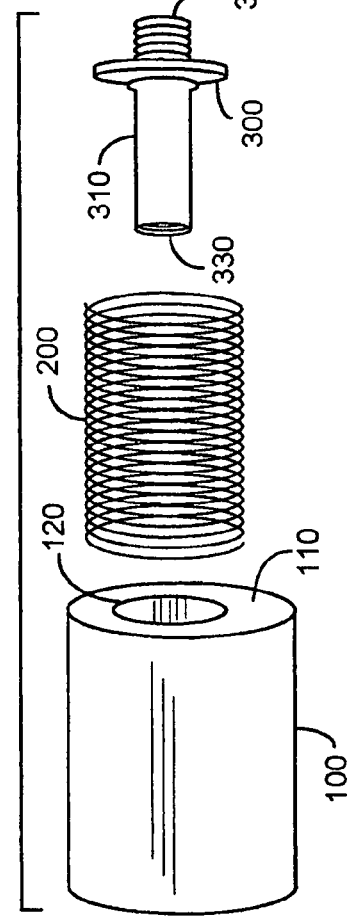
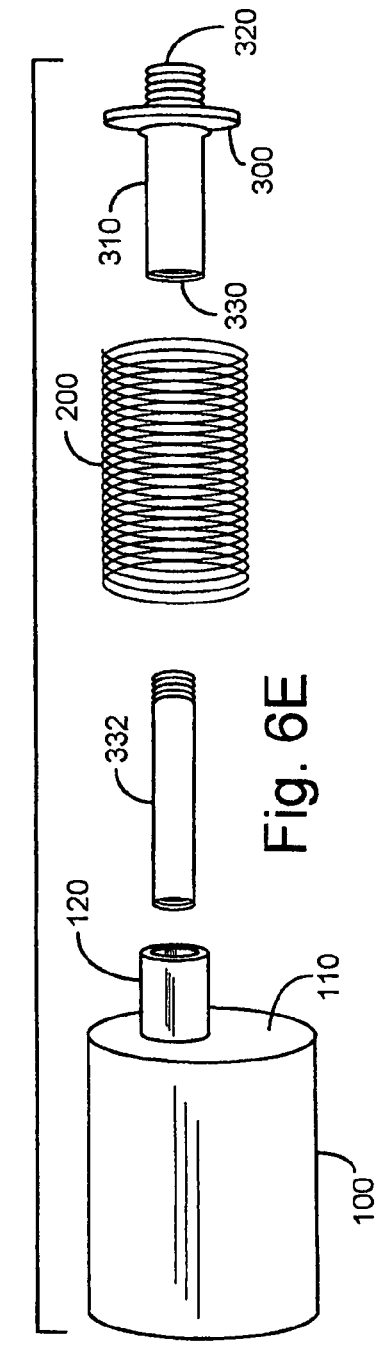

METHOD AND APPARATUS FOR A RETRACTABLE PNEUMATIC LINE COUPLING PROTECTOR

TECHNICAL FIELD

This invention relates to pneumatic line coupling protectors, particularly for truck-trailers and rail cars.

BACKGROUND ART

Air braking systems are commonly employed in commercial vehicles, particularly in truck-trailer vehicles. These systems use a pressurized air pneumatic line with a coupling connecting the trailer brake system to the truck brake system. This pressurized air pneumatic line is also known as a pneumatic line. As used herein, a pneumatic line will refer to a pressurized fluid pneumatic line, where the fluid may be predominantly air, other gases, or liquids.

FIG. 1 shows a truck 10 with pneumatic line 20 coupled by coupling 22 to pneumatic line 24 of trailer 12 to deliver the contents of pneumatic line 20 to pneumatic line 24 as found in the prior art.

FIG. 2 shows a typical coupling 22 of FIG. 1 of the prior art showing two coupling components 30 and 32 when connecting pneumatic lines 20 and 24 to deliver the contents of pneumatic line 20 to pneumatic line 24. FIG. 3 shows the separated prior art coupling components 30 and 32 of FIG. 2.

Coupling components 30 and 32, of FIGS. 2 and 3, create coupling 22 by being placed together at about a right angle, then twisted to be essentially parallel. A coupling component pair will refer to pairs of components such as coupling components, 30 and 32, which can form a coupling 22 for pneumatic lines. When coupled 22, the truck 10 braking system controls the trailer 12 braking system based upon the pressure in the pneumatic line including 20-22-24.

The standard braking system operates by assuming that low pressure in the coupled pneumatic line 24, means that the brakes should be applied. However, one problem frequently encountered with the prior art system is that when a truck-trailer turns at a sharp angle, there is a tendency for the coupling components 30-32 to be twisted out of the parallel arrangement shown in FIG. 2. When this happens, even when the coupling remains engaged, there is often a loss of pressure in the pneumatic line 24 sufficient to cause the brakes of the trailer 12 to lock. When the trailer brakes lock up, the truck driver must leave the cab, and reassemble the coupling 22 to get the trailer brakes to unlock.

What is needed is a mechanism protecting a pneumatic coupling 22 from being inadvertently twisted, that is easy to use and quick to apply.

SUMMARY OF THE INVENTION

FIGS. 4A to 6E show various aspects of an apparatus of the invention, protecting a pneumatic coupling 22 as shown in FIGS. 2 and 3. The apparatus contains a spring stop 300 rigidly coupled to one of the pneumatic coupling components 30, 32, and a spring 200 between spring stop 300 and housing 100. Spring 200 engages spring stop 300 and housing 100 to urge housing 100 to essentially cover the pneumatic coupling component. Spring stop 300 supports 120 pneumatic line 20, coupled to spring stop 300, and coupled to the pneumatic coupling component.

While one specific pneumatic coupling pair has been used consistently throughout this application, the invention is applicable to other pneumatic coupling pairs.

The invention includes apparatus preferably protecting pneumatic coupling 22, which controls the braking system of trailer 12 by use of pneumatic line 20 from truck 10, as shown in FIG. 1.

The method of making this apparatus is by assembling spring 200 between spring stop 300 and housing 100, as shown in FIG. 6D.

This invention is easy to use, simple to make, and proven in field trials to protect the pneumatic coupling 22. It can be made from a wide variety of materials, with both housing 100 and spring stop 300 being made from essentially rigid materials, including, but not limited to, any or all of the following: metals, composites like fiber glass, or hard plastics.

A prototype was constructed and tested using iron-based alloys. The spring stop was a nut 300 on a threaded pipe 310 mating to pneumatic line 20 on one end and second pneumatic coupling component 30 on the other end, as shown in FIGS. 4A–5.

FIGS. 7A to 7H show aspects of some alternative embodiments of the invention, protecting a pneumatic coupling 22 as shown in FIGS. 2 and 3. The apparatus includes housing 100 coupled to collet clamp 130 supporting pneumatic line 20 coupled to a pneumatic coupling pair member, 30 or 32. The housing 100 is capable of both covering and revealing at least the pneumatic coupling pair member. The apparatus also includes collet press 140 matching collet clamp 130 and supporting pneumatic line 20. Whenever housing 100 is covering the pneumatic coupling member and collet press 140 is tensioned on collect clamp 130, housing 100 can protect the pneumatic coupling. Whenever housing 100 is revealing the pneumatic coupling member, the pneumatic coupling is modifiable.

The method of protecting pneumatic coupling 22 is by the following steps: Housing 100 is placed away from the pneumatic coupling component 30 or 32, shown in FIG. 4A. Connecting the pneumatic coupling components to create pneumatic coupling 22 is shown in FIG. 4B. Positioning housing 100 to essentially cover and protect pneumatic coupling 22 from twisting, is shown in FIG. 5.

Placing of housing 100 away from the pneumatic coupling pair member in FIG. 4A, further involves retracting housing 100 against the urging of spring 200 to expose the pneumatic coupling pair member. The positioning of housing 100, shown in FIG. 5, further includes releasing housing 100 to essentially cover and protect pneumatic coupling 22 from twisting.

The mechanisms of FIGS. 7A to 7H, are used in a similar fashion. Placing of housing 100 away from the pneumatic coupling pair member further involves moving housing 100 to expose the pneumatic coupling pair member. The positioning of housing 100, shown in FIG. 5, further includes moving housing 100 to essentially cover the pneumatic coupling pair member of pneumatic coupling 22, and tensioning collet press 140 onto collet clamp 130 to protect pneumatic coupling 22 from twisting.

The pneumatic coupling may be coupled to a pneumatic line of a first rail car controlling a braking system of the first rail car by a pneumatic line of a second rail car, or vice versa.

These and other advantages of the present invention will become apparent upon reading the following detailed descriptions and studying the various figures of the drawings.

BRIEF DESCRIPTION OF THE DRAWINGS

FIG. 6A shows housing 100 of FIGS. 4A–5 as a polygonal tube;

FIG. 6B shows housing 100 of FIGS. 4A–5 including a bonding site 111, near the housing end opposite the pneumatic coupling pair member, used to mechanically couple the spring to the housing to engage the spring;

FIG. 6C shows housing 100 of FIGS. 4A–5 as rectangular conduit and including a passage 120 with aperture allowing the passage of a pneumatic line connected to the pneumatic coupling component.

FIG. 6D shows the assembly of an embodiment of the invention, including housing 100 with passage 120, spring 200 and spring stop 300, which supports providing pneumatic line content by being hollow with threads 320 and 330;

FIG. 6E shows the example assembly of FIG. 6D further including extension pipe 332;

DETAILED DESCRIPTION OF THE INVENTION

Figure 1:
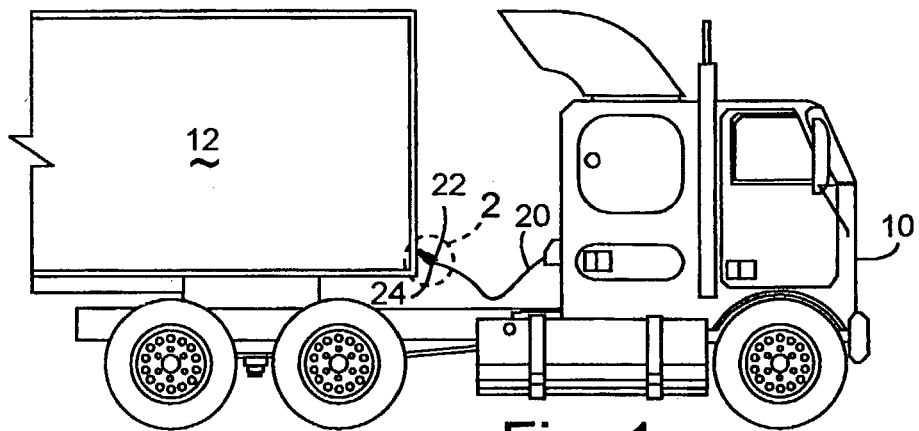
FIG. 1 shows a truck 10 with pneumatic line 20 coupled 22 to pneumatic line 24 of trailer 12 to deliver the contents of pneumatic line 20 to pneumatic line 24 as found in the prior art.
Figure 2:
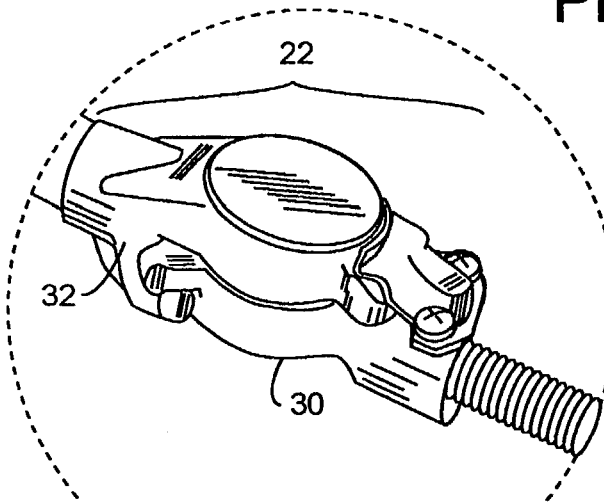
FIG. 2 shows a typical coupling 22 of FIG. 1 of the prior art showing two coupling components 30 and 32 when connecting pneumatic lines 20 and 24 to deliver the contents of pneumatic line 20 to pneumatic line 24.
Figure 3:
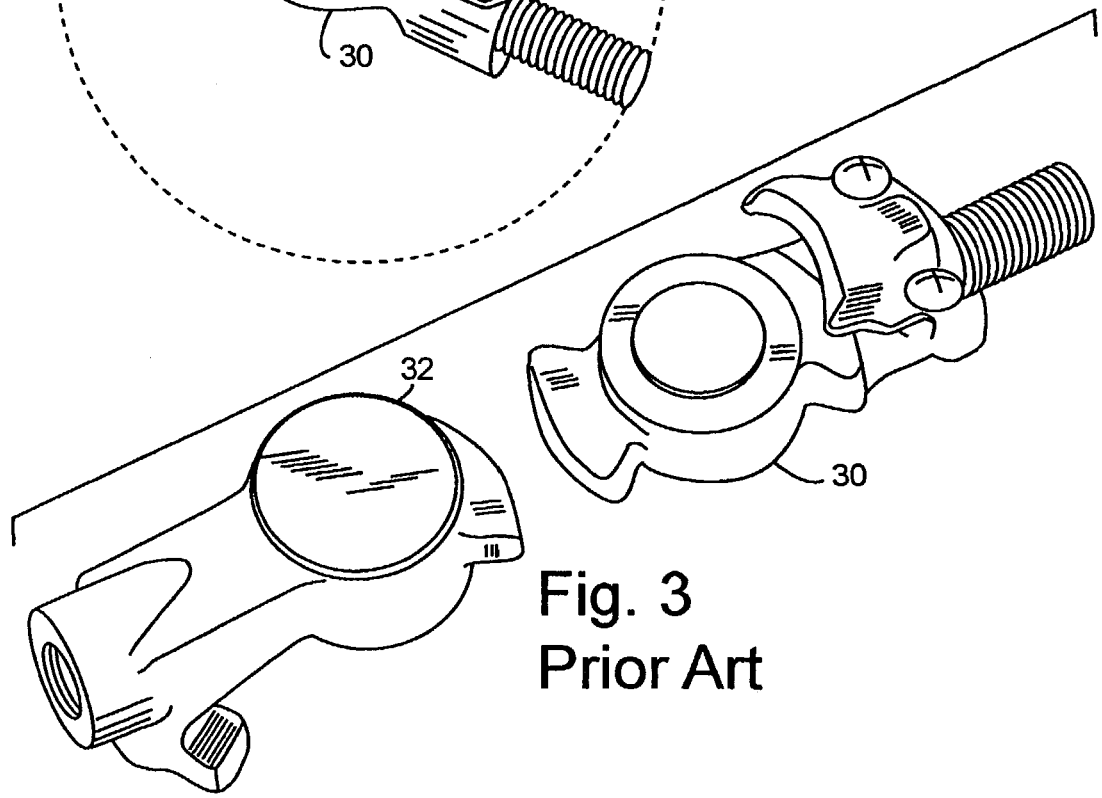
FIG. 3 shows the prior art coupling components 30 and 32 of FIG. 2 separately.

FIGS. 4A to 6D show various aspects of an apparatus of the invention protecting a two component pneumatic coupling 22 as shown in FIGS. 2 and 3. The apparatus contains a spring stop 300 rigidly coupled to one of the pneumatic coupling pair members, 30 and 32, and a spring 200 between spring stop 300 and housing 100. Spring 200 engages spring stop 300 and housing 100 to urge housing 100 to essentially cover the pneumatic coupling component. Spring stop 300 supports pneumatic line 20, coupled to spring stop 300, and coupled to the pneumatic coupling pair member.

Figure 4A:
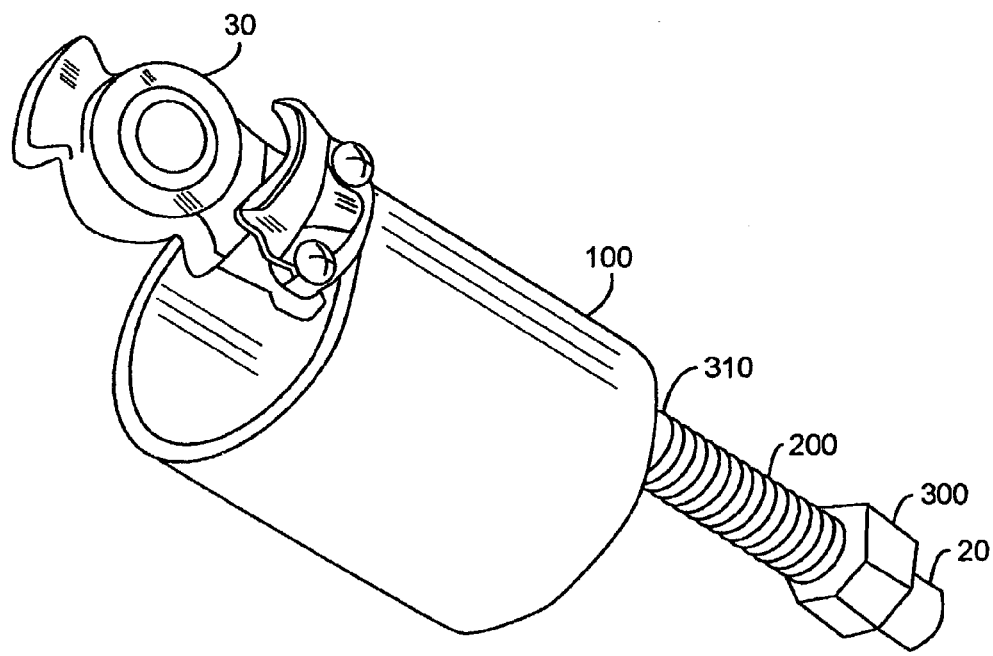
FIG. 4A shows retracting housing 100 away from pneumatic coupling component 30 against the urging of spring 200 against spring stop 100 to expose pneumatic coupling component 30.

FIG. 4A shows housing 100 retracted away from pneumatic coupling component 30 against the urging of spring 200 against spring stop 100 to expose pneumatic coupling component 30. The housing 100 is preferably rotated so that the housing catches on pneumatic coupling component 30.

Figure 4B:
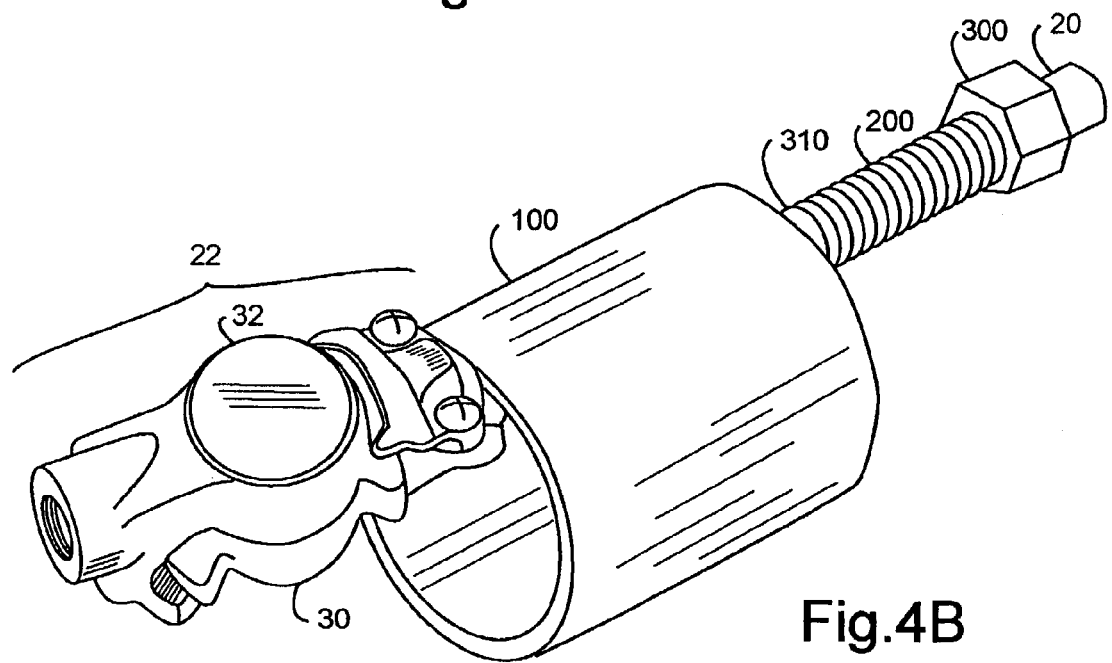
FIG. 4B shows creating pneumatic coupling 22 by connecting the pneumatic coupling pair members 30 and 32.

FIG. 4B shows pneumatic coupling 22 created by connecting the pneumatic coupling pair members 30 and 32.

Figure 5:
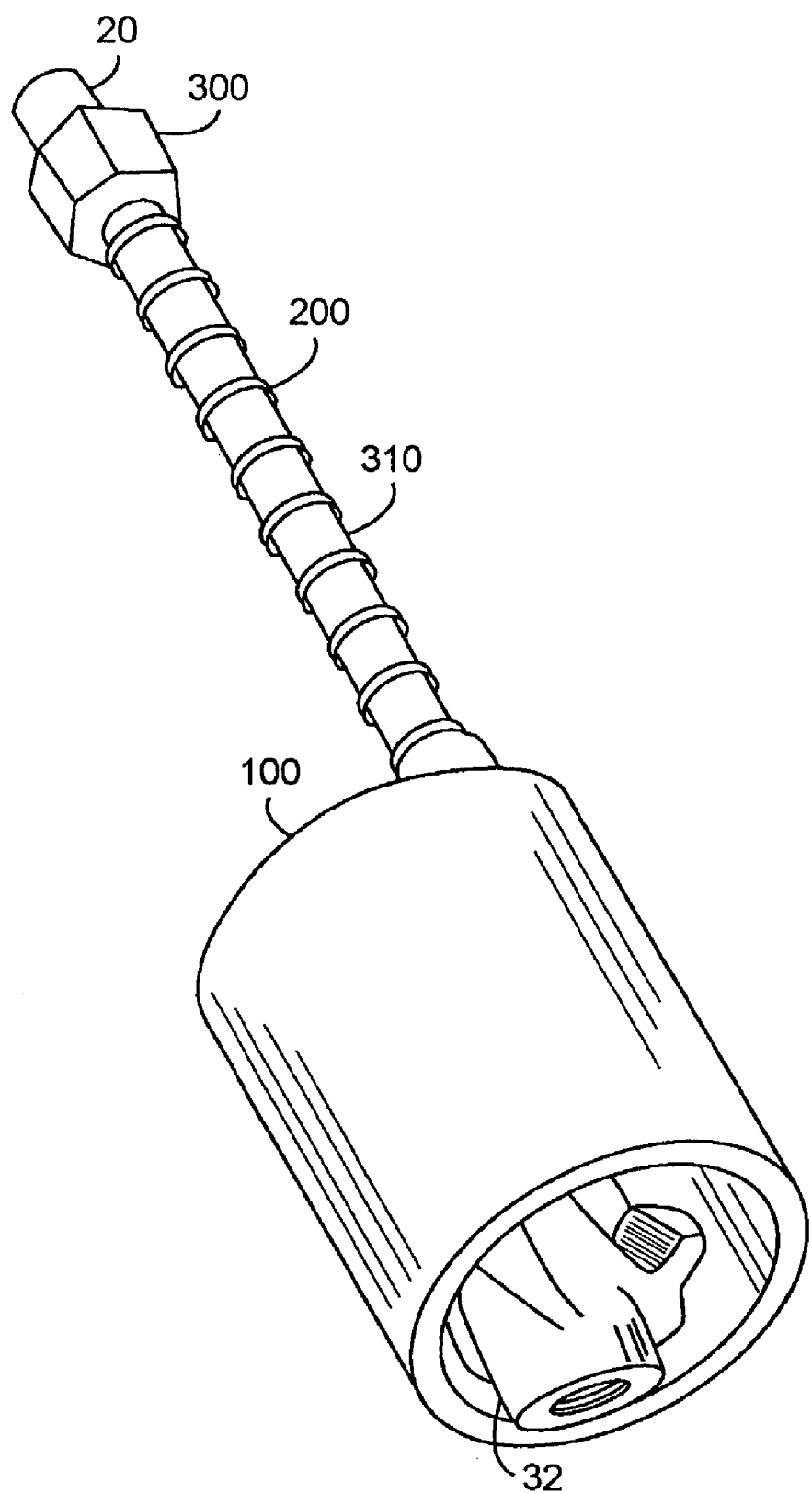
FIG. 5 shows releasing housing 100 to essentially cover and protect pneumatic coupling 22 of FIG. 4B from twisting.

FIG. 5 shows housing 100 to essentially covering and protecting pneumatic coupling 22 of FIG. 4B from twisting, resulting from releasing the housing 100 in FIG. 4B.

A prototype was constructed and tested using iron-based alloys. The spring stop was made as a nut 300 on a threaded pipe 310 mating to pneumatic line 20 on one end and second pneumatic coupling component 30 on the other end, as shown in FIGS. 4A–5. The mating of threaded pipe 310 to second pneumatic coupling component 30 is shown in FIGS. 4A and 4B.

This invention can be made from a wide variety of materials, with both housing 100 and spring stop 300 being made from essentially rigid materials, including, but not limited to, any or all of the following: metals, composites like fiber glass, or hard plastics.

The method of protecting pneumatic coupling 22 is by the following steps: Housing 100 is retracted away from the pneumatic coupling component 30 or 32 against the urging of spring 200 to expose the pneumatic coupling component as shown in FIG. 4A. Housing 100 is preferably rotated to catch on the pneumatic coupling component. Connecting the pneumatic coupling components to create pneumatic coupling 22 is shown in FIG. 4B. Releasing housing 100 to essentially cover pneumatic coupling 22 and to protect pneumatic coupling 22 from twisting is shown in FIG. 5.

FIGS. 6A to 6E show various examples of housing 100 contemplated by the invention.

FIG. 6A shows an example housing 100 of FIGS. 4A–5 as a polygonal tube with no cover 110.

FIG. 6B shows an example housing 100 of FIGS. 4A–5 including a bonding site 111, near the housing 100 end opposite the pneumatic coupling pair member, used to mechanically couple spring 200 to housing 100 engaging the spring, or alternatively, a cover 110 located inside the housing 100. Housing 100 also supports a pneumatic line going through housing 100 to couple a pneumatic coupling pair member.

FIG. 6C shows an example housing 100 of FIGS. 4A–5 as a rectangular conduit and including a passage 120 supporting pneumatic line connected to the pneumatic coupling pair member (which is not shown).

FIG. 6D an example assembly of an embodiment of the invention, including housing 100 with cover 110 including passage 120, spring 200 and spring stop 300, which supporting a pneumatic line by being hollow with threads 320 and 330.

FIG. 6E shows the example assembly of FIG. 6D further including extension pipe 332.

As shown in FIG. 6D, spring stop 300 includes a plate as part of a single piece including hollow cylinder 310 with threads 320 and 330 on opposite ends of cylinder 310. Spring stop 300 may be manufactured as a single molded part, or alternatively, as the result of bonding two molded parts. Threads 320 and 330 are preferably machined, but may be the result of molding.

Housing 100 may be any of the following: a cylindrical pipe as shown in FIGS. 4A–5, a rectangular conduit as shown in FIG. 6C, and a polygonal tube as shown in FIG. 6A.

FIGS. 6C to 6E show examples of embodiments of the invention in which housing 100 further including a cover 110 near the housing 100 end opposite said pneumatic coupling pair member (not shown). In FIG. 6B, cover 110 is inside housing 100. In FIGS. 6C–6D, cover 110 is at housing 100 end, opposite said pneumatic coupling pair member (not shown).

Cover 110 in in most embodiments provides a mechanism for spring 200 to engage housing 100. Note that spring 200 may further engage housing 100 by being coupled to the outer surface of housing 100. The coupling of spring 200 to the outer surface of housing 100 may be effected by at least any of the following: welding, binding, or an attachment mechanism such as a screw down. The binding may be the result of a gluing or soldering process.

FIGS. 6C–6E show including passage 120 supporting the pneumatic line 20, which can be coupled to spring stop 300, and coupled to pneumatic coupling pair member 32 of FIGS. 4A–5.

FIGS. 6C and 6E show a preferred passage 120 as an essentially convex shape, which has a center distinct from the center of cover 110, as well as distinct from the center of housing 100.

In other embodiments of the invention, passage 120 need not have any or all of these properties. FIG. 6B shows a bonding site 111 inside housing 100 as essentially a ridge, wherein passage 120 (which is unlabeled) has essentially the same center as at least housing 100.

FIG. 6B also shows a bonding site 111 near the end of housing 100 opposite pneumatic coupling pair member 32 of FIGS. 4A–5, mechanically coupling spring 200 to housing 100 to engage spring 200. Bonding site 111 is located inside housing 100 in FIG. 6B. One skilled in the art will recognize that spring 200 may be bonded at a bonding site alternatively found at the other end of housing 100, or on the outside of housing 100 near the end opposite the pneumatic coupling pair member.

The method of making the apparatus shown in FIGS. 4A to 5, is by assembling spring 200 between spring stop 300 and housing 100, as shown in FIG. 6D.

This invention is easy to use, simple to make, and proven in field trials by the inventor to protect the pneumatic coupling 22. It can be made from a wide variety of materials, with both housing 100 and spring stop 300 being made from essentially rigid materials, including, but not limited to, any or all of the following: metals, composites like fiber glass, or hard plastics.

FIGS. 7A to 7H show aspects of some alternative embodiments of the invention, protecting a pneumatic coupling 22 as shown in FIGS. 2 and 3. The apparatus includes housing 100 coupled to collet clamp 130 supporting pneumatic line 20 coupled to a pneumatic coupling pair member. The housing 100 is capable of both covering and revealing at least the pneumatic coupling pair member. The apparatus also includes collet press 140 matching collet clamp 130 and supporting pneumatic line 20. Whenever housing 100 is covering the pneumatic coupling pair member and collet press 140 is tensioned on collect clamp 130, housing 100 can protect pneumatic coupling 22. Whenever housing 100 is revealing the pneumatic coupling pair member, pneumatic coupling 22 is modifiable.

Figure 7A:
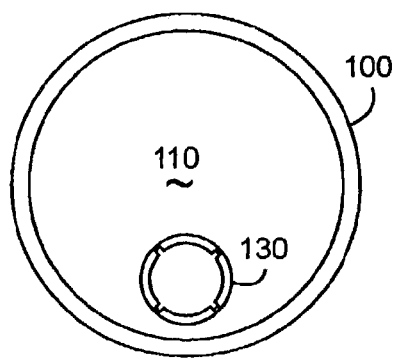
FIGS. 7A and 7B show a side view and perspective view, respectively, of housing 100 cover 110 and collet clamp 130.
Figure 7B:
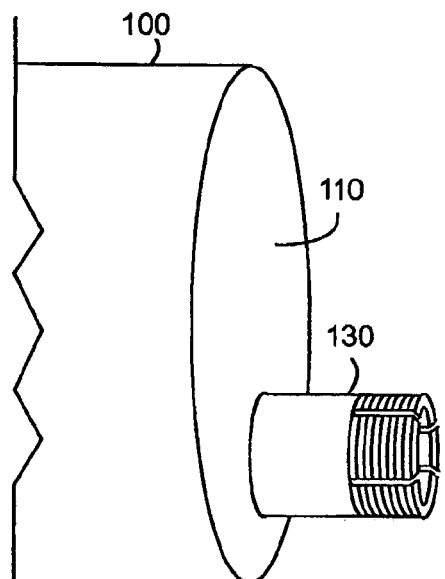

FIGS. 7A and 7B show a side view and perspective view, respectively, of housing 100, cover 110 and collet clamp 130.

Figure 7C:
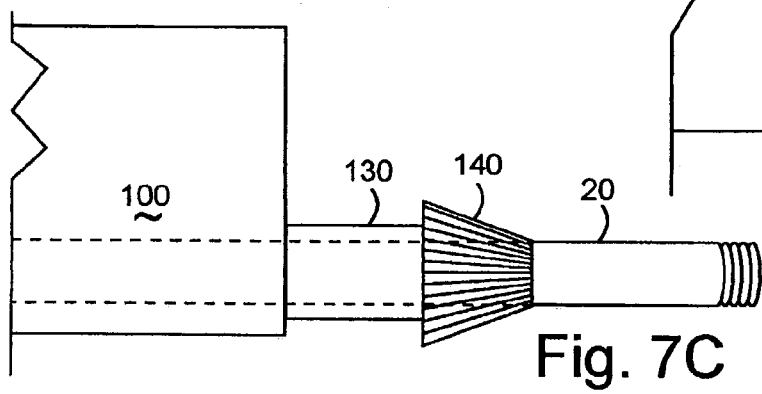
FIG. 7C shows housing 100 and collect clamp 130 with collet press 140 tensioned on collet clamp 130 and supporting pneumatic hose 20, clamping the housing on pneumatic line 20, which when covering the pneumatic coupling pair member, protects a pneumatic coupling of the member.

FIG. 7C shows housing 100 and collect clamp 130 with collet press 140 tensioned on collet clamp 130 and supporting pneumatic hose 20, clamping the housing on pneumatic line 20, which when covering the pneumatic coupling pair member, protects a pneumatic coupling of the member.

Figure 7D:
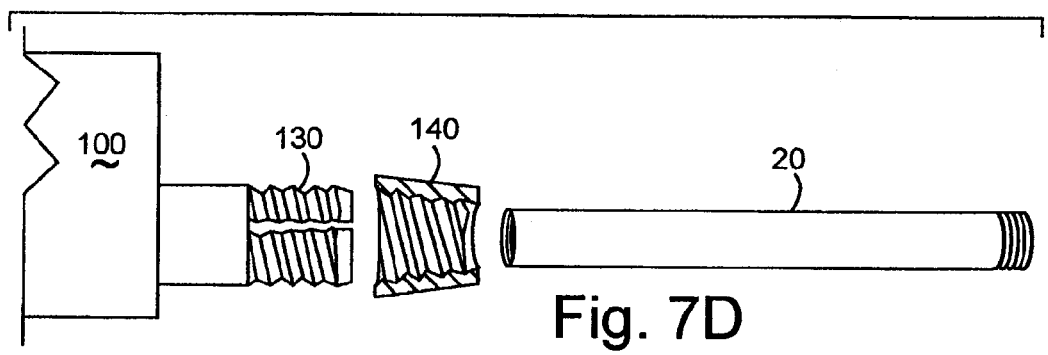
FIG. 7D shows an exploded view of one alternative for the elements of FIG. 7C with a cross section of collet press 140 and collet clamp 130 made of a bendable material.

FIG. 7D shows an exploded view of one alternative for the elements of FIG. 7C with a cross section of collet press 140 and collet clamp 130 made of a bendable material.

Figure 7E:
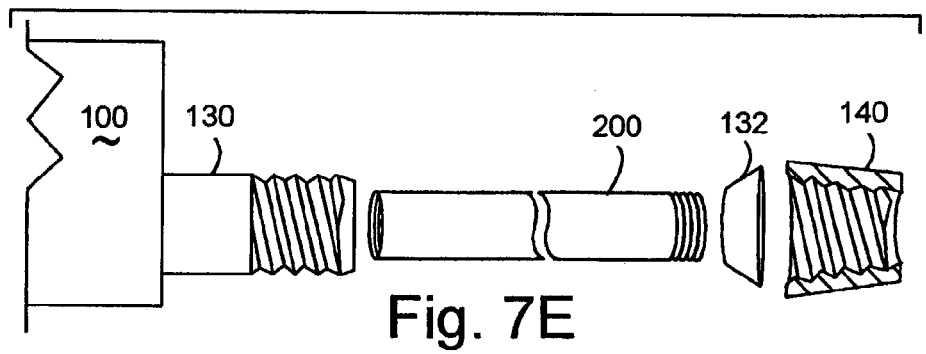
FIG. 7E shows an exploded view of another alternative for the elements of FIG. 7C including collet clamp 130 including a collet thread matching collet press 140 and a collet block 132 tensionable between collet thread and collet press 140.

FIG. 7E shows an exploded view of another alternative for the elements of FIG. 7C including collet clamp 130 including a collet thread matching collet press 140 and a collet block 132 tensionable between collet thread and a cross section of collet press 140.

Figure 7F:
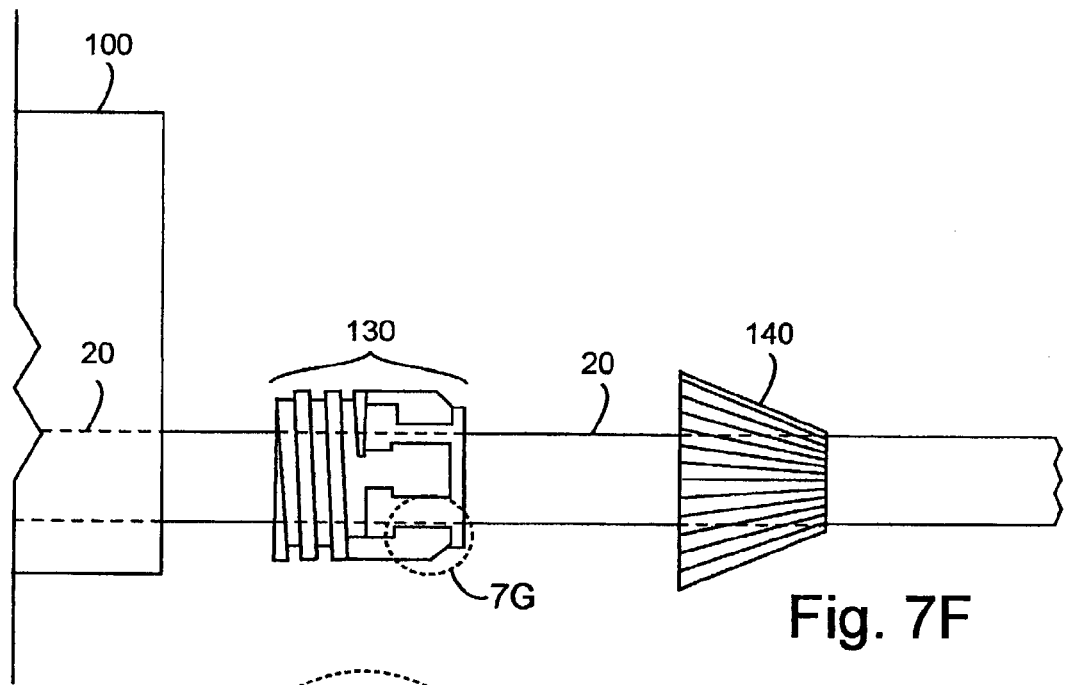
FIG. 7F shows a side of housing 100 coupled with an assembled collet clamp 130 supporting pneumatic line 20 and matching collet press 140.
Figure 7G:
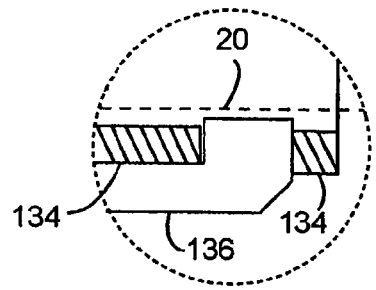
FIG. 7G shows a blow-up of the assembled collet clamp including collet clamp template 134 and collet clamp jaw 136 supporting pneumatic line 20.
Figure 7H:
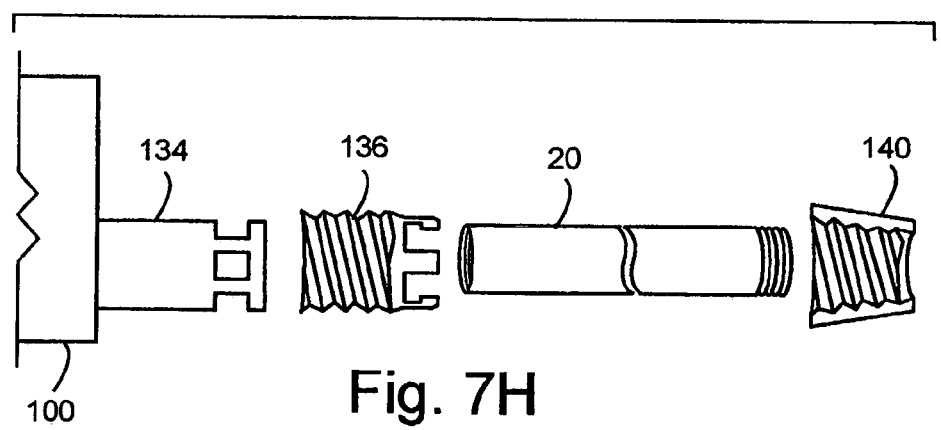
FIG. 7H shows an exploded view of the invention's apparatus of FIG. 7H, showing housing 100 coupled with collet clamp template 134, collet clamp jaw 136, pneumatic pipe 20, and a cross section of collet press 140.

FIGS. 7F to 7H show housing 100 coupled with collet clamp 130, including collet clamp template 134 coupled to housing 100 and collet clamp jaw 136 aligned by collet clamp template 134, supporting pneumatic line 20 and matching collet press 140.

FIG. 7F shows a side of housing 100 coupled with an assembled collet clamp 130 supporting pneumatic line 20 and matching collet press 140.

FIG. 7G shows a blow-up of the assembled collet clamp including collet clamp template 134 and collet clamp jaw 136 supporting pneumatic line 20.

FIG. 7H shows an exploded view of the invention's apparatus of FIG. 7H, showing housing 100 coupled with collet clamp template 134, collet clamp jaw 136, pneumatic pipe 20 and a cross section of collet press 140.

The coupling of housing 100 to collet clamp 130 may be achieved in many ways, including, but not limited to, casting of one or more parts, gluing, welding, or screwing housing 100 and collet clamp 130 together.

Collet press 140 may be made from a variety of materials, at least one essentially rigid material including composites, such as fiber glass, a hard plastic, and a metal alloy.

Making the apparatus shown in FIGS. 7A to 7H can be readily done by the following. Inserting pneumatic line 20 through collet press 140. Inserting pneumatic line 20 through housing 100 and collet clamp 130 to match collet press 140. And coupling pneumatic line 20 to the pneumatic coupling member, preferably 30.

The preceding embodiments have been provided by way of example and are not meant to constrain the scope of the following claims.

The invention claimed is:

1. An apparatus protecting a pneumatic coupling comprising a first pneumatic coupling component and a second pneumatic coupling component, the apparatus protecting a pneumatic coupling comprising:

a spring stop coupled to said first pneumatic coupling component; and a spring between said spring stop and a housing, wherein said spring engages said spring stop and engages said housing to urge said housing to cover said pneumatic coupling, wherein said second pneumatic coupling component is coupled to a trailer pneumatic line controlling a trailer braking system; and wherein said first pneumatic coupling component is coupled to a truck pneumatic line used to control said trailer braking system.

2. A method of making the apparatus of claim 1, comprising the steps:

assembling said spring between said spring stop and said housing;

further comprising at least one of attaching a cover to said housing, near an end of said housing opposite a pneumatic coupling pair member and creating a bonding site, near said housing end opposite said pneumatic coupling pair member, mechanically coupling said spring to said housing; and creating an aperture in said cover, to accept a pneumatic line.

3. A method of protecting a pneumatic coupling the pneumatic coupling comprising a first pneumatic coupling component and a second pneumatic coupling component, said method comprising the steps:

placing a housing away from said first pneumatic coupling component to expose said first pneumatic coupling component;

connecting said first pneumatic coupling component to a second pneumatic coupling component to create said pneumatic coupling; and positioning said housing to cover said pneumatic coupling.

4. The method of claim 3, wherein the step of placing said housing away from said first pneumatic coupling component further comprises the steps:

overcoming a spring force to retract said housing away from said first pneumatic coupling component to expose said first pneumatic coupling component.

5. The method of claim 4, wherein the step of retracting said housing further comprises the step of:

rotating said housing to catch against said first pneumatic coupling component.

6. The method of claim 3, wherein the step of positioning said housing to cover said pneumatic coupling further comprises the step of:

tensioning a collet press matching a collet clamp coupled to said housing to protect said pneumatic coupling from twisting.

7. Apparatus for protecting a pneumatic coupling, wherein the pneumatic coupling comprises a first pneumatic coupling component attached to a first pneumatic line, and said first pneumatic coupling component being coupled to a second pneumatic coupling component attached to a second pneumatic line, said apparatus for protecting a pneumatic coupling comprising:

a pneumatic line extension having a first end and a second end, said pneumatic line extension being coupled to a spring stop at said first end and to said first coupling component at said second end of said pneumatic line extension, said spring stop coupled to said pneumatic line, a housing around said first pneumatic coupling component, said housing having an aperture to receive said first pneumatic line extension, said housing capable of being slid along said pneumatic line extension away from said first pneumatic coupling component to expose said first pneumatic coupling component, a spring positioned around said pneumatic line extension between and engaging said spring stop and said housing, whereby said spring tends to urge said housing to cover said pneumatic coupling.

8. The apparatus for protecting a pneumatic coupling of claim 7, wherein said apparatus for protecting a pneumatic coupling includes holding means for causing said housing to remain where placed when said housing is slid along said pneumatic line extension away from said first pneumatic coupling component to expose said first pneumatic coupling component.

9. The apparatus for protecting a pneumatic coupling of claim 8, wherein said holding means comprises said housing being capable of rotating to contact said first coupling component when said housing is slid along said pneumatic line extension away from said first pneumatic coupling component to expose said first pneumatic coupling component so that said housing remains retracted away from said pneumatic coupling.

10. A method for coupling and uncoupling a pneumatic coupling wherein the pneumatic coupling comprises a first pneumatic coupling component attached to a first pneumatic line, and said first pneumatic coupling component being coupled to a second pneumatic coupling component attached to a second pneumatic line, the method steps comprising:

providing a housing around said first pneumatic coupling component, said housing having an aperture to receive a pneumatic line extension coupled to said first pneumatic line, said housing capable of being slid along said pneumatic line extension away from said first pneumatic coupling component to expose said first pneumatic coupling component; a spring stop coupled to said pneumatic line extension; and a spring positioned around said pneumatic line extension between and engaging said spring stop and said housing, said spring tending to urge said housing to cover said pneumatic coupling, moving said housing away from said first pneumatic coupling component to expose said first pneumatic coupling component, coupling said first pneumatic coupling component to said second pneumatic coupling component to make said pneumatic coupling, allowing said housing to move toward said pneumatic coupling to cover said pneumatic coupling.

11. The method of claim 10 further comprising the steps:

moving said housing away from said pneumatic coupling to expose said pneumatic coupling.

uncoupling said first pneumatic coupling component from said second pneumatic coupling component.

allowing said housing to move toward said first pneumatic coupling component to cover said first pneumatic coupling component.

* * * * *